United States Patent [19]

Eichelberger et al.

[11] 3,826,969

[45] July 30, 1974

[54] HIGHLY STABLE PRECISION VOLTAGE SOURCE

[75] Inventors: Charles W. Eichelberger, Schenectady; Philip M. Garratt, Amsterdam, both of N.Y.

[73] Assignee: General Electric Company, Schenectady, N.Y.

[22] Filed: Apr. 2, 1973

[21] Appl. No.: 347,239

[52] U.S. Cl. .................. 323/19, 323/22 Z, 323/40, 330/30 D

[51] Int. Cl. .............................................. G05f 1/58

[58] Field of Search ...... 323/16, 19, 22 T, 40, 22 Z; 330/30 D, 24, 69, 86, 107

[56] References Cited

UNITED STATES PATENTS

| | | | |
|---|---|---|---|
| 3,479,534 | 11/1969 | Miller | 330/30 D X |
| 3,624,492 | 11/1971 | Nielsen | 323/22 Z X |
| 3,634,751 | 1/1972 | Miller | 323/40 X |
| 3,686,557 | 8/1972 | Futamura | 323/19 X |

*Primary Examiner*—Gerald Goldberg
*Attorney, Agent, or Firm*—Louis A. Moucha; Joseph T. Cohen; Jerome C. Squillaro

[57] ABSTRACT

A single polarity voltage source includes a single operational amplifier having its output connected through a serially connected first diode and resistor to the non-inverting input of the amplifier. The juncture of the resistor and amplifier input is connected through a zener diode to ground. The source output voltage of positive polarity is developed across the serially connected resistor and zener diode. This output voltage is highly stable and is used as the supply voltage for the zener diode to thereby provide an extremely stable current supply to the zener diode. A ratio of the resistances of high stability resistors in the inverting input and feedback circuits of the amplifier determines the amplifier gain and thus the magnitude of the output voltage relative to the zener diode voltage. A negative polarity output voltage is developed across the output of a second operational amplifier functioning as an inverter and having its inverting input connected through a potentiometer to the juncture of the serially connected first diode and resistor. The potentiometer is adjusted to match the value of the negative polarity output voltage to the positive polarity output.

16 Claims, 1 Drawing Figure

HIGHLY STABLE PRECISION VOLTAGE SOURCE

Figures 1, 2:
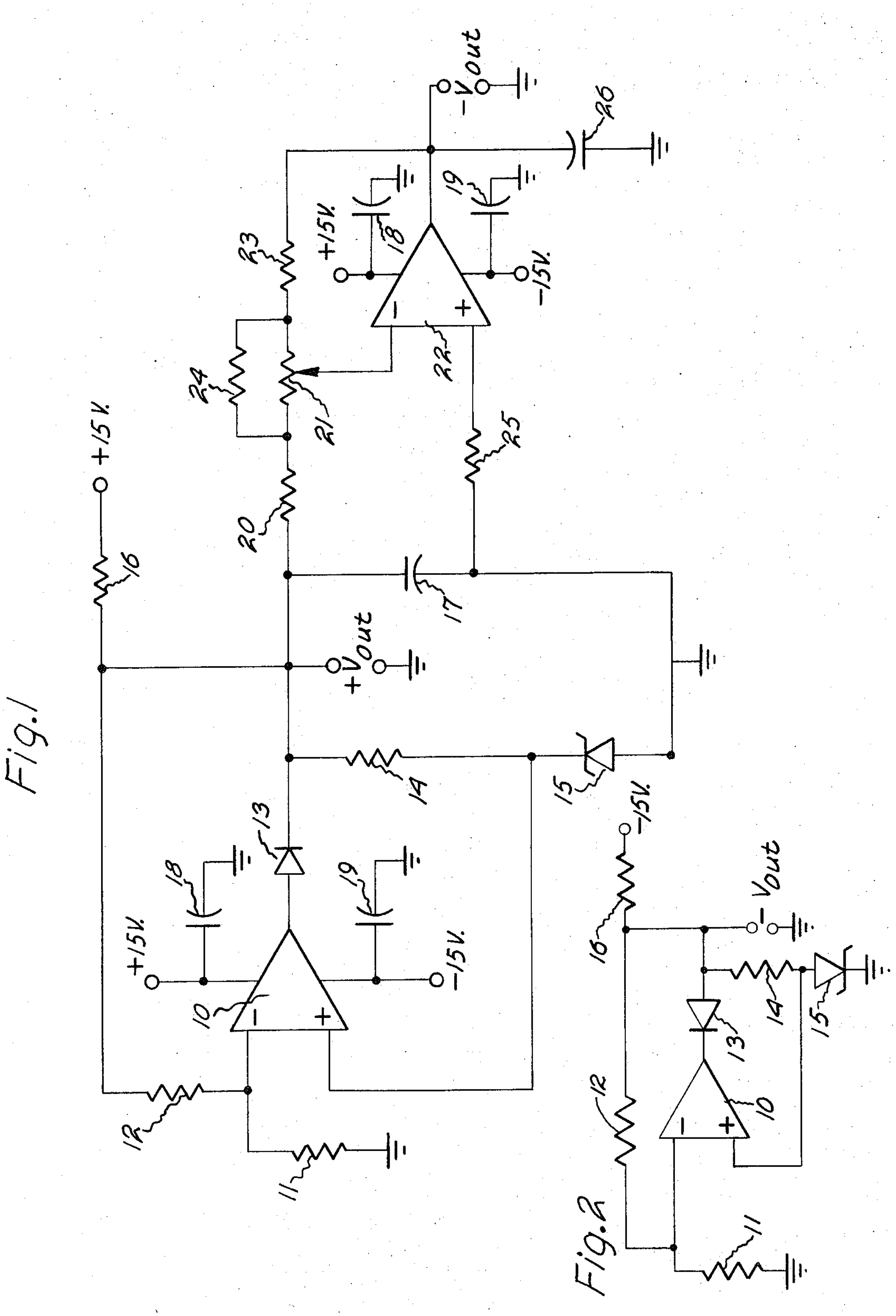

Our invention relates to a voltage source of simple circuitry that provides a highly stable precision output voltage, and in particular, to a voltage source utilizing only one operational amplifier when only a single polarity output voltage is required, and two amplifiers for a bipolarity output.

Highly stable precision voltage sources are required in many circuit applications wherein the use of a less stable or less precise voltage source could cause poor performance of the circuit being supplied from such voltage source. In particular, a highly stable precision voltage source is required for providing the precision bias for analog computers, and for providing the reference voltage in control systems of many types. As one specific example of a circuit which requires a highly stable precision voltage source, there is a scaleable digital voltmeter described and claimed in our pending and concurrently filed application Ser. No. 347,137 entitled "Digitally Scaled Digital Voltmeter".

Highly stable precision voltage sources have been developed in the prior art, but always with considerable circuit complexity which includes the interconnection of many electronic circuit components. Obviously, the greater the number of circuit components, the greater is the possibility of circuit failure.

Therefore, a principal object of our invention is to provide a highly stable precision voltage source.

Another object of our invention is to form the voltage source from simple circuitry.

A further object of our invention is to form the circuitry of our voltage source from a minimum number of interconnected electronic components.

Briefly stated, and in accordance with the objects of our invention, we provide a single polarity voltage source which includes a single operational amplifier having its output connected through a serially connected first diode and resistor to the non-inverting input thereof. The juncture of the resistor and amplifier non-inverting input is connected through a zener diode to ground. The source output voltage of positive polarity is developed across the serially connected resistor and zener diode. This output voltage is highly stable and is used as the supply voltage for the zener diode to thereby provide an extremely stable current supply to the zener diode. High stability resistors are connected in the inverting input circuit of the amplifier and the ratio of their resistance values determines the non-inverting gain of the amplifier which becomes the multiplier of the zener diode voltage for determining the magnitude of the source output voltage. A negative polarity output voltage of magnitude equal to the positive polarity output voltage may also be obtained, if desired, by utilizing a second operational amplifier functioning as an inverter wherein the output voltage thereof is the source of negative polarity output voltage. The inverting input of the second operational amplifier is connected through a potentiometer to the juncture of the serially connected first diode and resistor. The potentiometer is adjusted to match the magnitude of the negative polarity output voltage to that of the positive polarity.

The features of our invention which we desire to protect herein are pointed out with particularity in the appended claims. The invention itself, however, both as to its organization and method of operation together with further objects and advantages thereof may best be understood by reference to the following description taken in connection with the accompanying drawings wherein like parts in each of the several figures are identified by the same reference character and wherein:

FIG. 1 is a schematic diagram of the highly stable precision voltage source for providing bipolarity output voltages in accordance with our invention; and FIG. 2 is a simplified schematic diagram of our highly stable precision voltage source for providing only a negative polarity output voltage.

Referring now to FIG. 1, our highly stable precision voltage source includes a first high amplification device with stable offset voltage, such as an operational amplifier 10 having a resistor 11 connected from the inverting input terminal (illustrated as a negative input terminal) of the amplifier to ground. A feedback resistor 12 is connected around amplifier 10 to the inverting input terminal thereof from the output of amplifier 10 through a diode 13 having its anode connected to the output of the amplifier. The ratio of the sum of the resistances of resistors 11 plus 12 to that of resistor 11 determines the non-inverting gain of amplifier 10 for the signal applied at its positive input, and hence determines the magnitude of the source output voltage as will be described hereinafter. For this reason, resistors 11 and 12 are preferably of the high stability type (i.e., high stability with temperature and time). The juncture of resistor 12 and diode 13 is connected through a resistor 14 to the non-inverting input terminal (illustrated as a positive input terminal) of amplifier 10. The juncture of resistor 14 and the non-inverting input terminal of amplifier 10 is connected to a stable (with respect to temperature) device exhibiting a substantial impedance change from high to low impedance for a small change in voltage at a predetermined voltage thereacross. As a specific example of such device, the juncture of resistor 14 and non-inverting input terminal of amplifier 10 is connected to the cathode of a high temperature stability zener diode 15 having its anode connected to ground. Finally, a resistor 16 is connected from the juncture of diode 13 and resistor 14 to a positive polarity voltage power supply (+15 volts in the illustrated embodiment) for driving such juncture positive to initiate the proper polarity output of amplifier 10, and secondarily to supply some of the load current to zener diode 15 which would otherwise be supplied completely by amplifier 10.

The voltage $+V_{out}$ developed across resistor 14 and zener diode 15 with reference to ground is the positive polarity output of our voltage source and the components hereinabove recited comprise our entire highly stable precision voltage source if only a positive polarity output voltage is required. Since the source output voltage $+V_{out}$ if fixed, and the voltage across zener diode 15 is fixed for a fixed current therethrough, the resistance value of resistor 14 is determined by the desired fixed current flowing through the zener diode.

Depending upon the circuit being supplied with the output voltage of our voltage source, a capacitor 17 may be utilized and connected across resistor 14 and zener diode 15 for filtering out any transients generated in the circuit being supplied with the output voltage and which are reflected into our voltage source. Thus, in circuits wherein transients do not generally occur, or in which proper means are provided for suppressing such transients, capacitor 17 may be omitted. The conventional positive and negative polarity voltage power supply connections to operational amplifier 10 are indicated for a specific power supply voltage of 15 volts which conveniently would be the same power supply to which resistor 16 is connected. Power supply by-pass capacitors 18 and 19 are illustrated in their conventional connection to the voltage power supply inputs to amplifier 10.

If the circuit supplied with voltage from our voltage source requires a bipolarity voltage (of equal magnitude), th following circuit components must be additionally used in order to provide the negative polarity output voltage: A resistor 20 has one end connected to the juncture of diode 13 and resistor 14, and the second end connected to a first end of a potentiometer 21 having a tap point connected to the inverting input terminal of a second high amplification device with stable offset voltage, such as an operational amplifier 22 which functions as an inverter having a gain of unity due to the adjustment of potentiometer 21. The gain of 1.0 results in the negative polarity output voltage of our voltage source being matched in magnitude to that of the positive polarity output. The output of inverter 22 is connected through a feedback resistor 23 to the second end of potentiometer 21. In order to obtain this gain of 1.0 for inverter 22, the resistance of feedback resistor 23 is equal to that of input resistor 20, or more precisely, the ratio of resistances of resistor 23 plus potentiometer 21 to the right of the tap point to that of resistor 20 plus potentiometer 21 to the left of the tap point is equal to 1.0. Resistors 20 and 23 are preferably of the high precision type (i.e., 0.1 percent precision) in order that potentiometer 21 can be a small percentage of the total resistance and therefore variations in potentiometer 21 will have a small effect on circuit stability. Although not necessary, a fixed resistor 24 can be connected across the outer ends of the potentiometer to effectively reduce the potentiometer's variation with temperature, mechanical stress and vibration and other factors. A resistor 25 is connected from the non-inverting input terminal of amplifier 22 to ground in order to minimize the effects of bias currents at the input of inverter 22. Its resistance value is equal to the parallel combination of resistors 20 and 23. The voltage $-V_{out}$ developed at the output of amplifier 22 with reference to ground is the negative polarity output of our volgate source, and as stated above, the adjustment of potentiometer 21 determines the precise gain of 1.0 for amplifier 22 to thereby provide that the negative polarity output voltage $-V_{out}$ is equal in magnitude to the positive polarity output $+V_{out}$.

The output of amplifier 22 may also be connected through a capacitor 26 to ground for filtering transients in the same manner as filter capacitor 17 is employed with amplifier 10. Also, the power supply by-pass capacitors 18 and 19 are shown connected to amplifier 22 in the same manner as with respect to amplifier 10. Finally, the 15 volt power supply ground associated with by-pass capacitors 18 and 19 need not be the same ground as what may be described as the reference ground associated with resistors 11 and 25, capacitor 26 and the ground side of the output voltages $\pm V_{out}$ of our voltage source.

Our voltage source thus consists basically of a non-inverting circuit including operational amplifier 10 which has its input and feedback resistors selected to provide a predetermined gain for the amplifier, and an inverter circuit including operational amplifier 22 which has a gain of 1.0. If only the positive polarity output voltage is required, the inverter circuit is omitted.

And it should be obvious to one skilled in the art that if only a negative polarity output voltage is required from our voltage source, it can be achieved by using only the hereinabove described circuit of operational amplifier 10 by reversing the connections of diode 13 and zener diode 15, and reversing the polarity of the voltage supply to which resistor 16 is connected as illustrated in the simplified schematic diagram of FIG. 2.

Our zener diode stabilized voltage source uses the stable output voltage $+V_{out}$ as the supply voltage for the reference zener diode 15 thereby providing an extremely stable current supply to the zener diode. The zener diode voltage is applied to the non-inverting side (positive polarity input terminal) of operational amplifier 10, and since the operational amplifier gain is greater than 1.0, the output voltage thereof supplies the stable current to the zener diode through resistor 14. Diode 13 at the output of amplifier 10 insures that amplifier 10 cannot draw current from ground through the zener diode 15 and incorrectly reach stable operation with voltage on the zener diode reversed from normal. Thus, diode 13 insures that operational amplifier 10 cannot drive the zener diode 15 in the wrong polarity direction. Resistor 16 also functions to supply current to force the voltage across zener diode 15 in the correct direction independently of operational amplifier 10 and thereby insures that diode 13 is driven into conduction by the amplifier. And as stated above, resistor 16 increases the output current capability of the circuit beyond the output capability of amplifier 10. Thus, in the case of a 9 volt rated zener diode 15, the output voltage of our voltage source provided across resistor 14 and zener diode 15 with respect to ground is $9 \times R_{11} + R_{12}/R_{11}$ volts (where $R_{11}$ and $R_{12}$ are resistances of resistors 11 and 12, respectively,) and is a highly stable precision voltage due to the zener voltage stabilizing its own drive current, and resistors 11 and 12 being of high stability. The degree of stability of our voltage source is obviously determined by the degree of stability of resistors 11 and 12, and thus a more highly stable precision voltage source is obtained by utilizing higher stability resistors for these two circuit components, as well as using a zener diode 15 having a higher temperature stability.

From the foregoing description, it can be appreciated that our invention makes available a new voltage source which provides a D.C. output voltage of magnitude $V_{out}$ = zener voltage $\times(R_{11} + R_{12})/R_{11}$ which is highly stable and precise due to resistors 11 and 12, being of the high stability type and zener diode 15 being a highly stable precision voltage device. The output voltage can be changed by utilizing a zener diode having a different voltage rating and, or, selecting resistors 11 and 12 to provide a different resistance ratio $R_{11} + R_{12}/R_{11}$. Our voltage source is of simple circuitry and provides what we believe is the most stable precise output voltage that can be obtained with the minimum number of circuit components utilized in our voltage source. A highly stable precision of better than one part in 10,000 over a temperature range of 0 percent to 50°C has been noted for our voltage source, and this stability was obtained using readily available standard components, and can undoubtedly be further improved by using more expensive components having higher precision and stability. Our voltage source requires no adjustment once the proper value circuit components have been selected, and a single potentiometer is used to match the negative polarity output voltage to the positive polarity output. Our invention is defined by the following claims.

What we claim as new and desire to secure by Letters Patent of the United States is:

1. A highly stable precision voltage source of simple circuitry comprising high amplification, stable offset voltage means, a first diode and first resistor of the high stability type serially connected in feedback circuit relationship from a first output of said high amplification, stable offset voltage means to a first inverting input thereof, a second resistor of the high stability type connected from the first inverting input of said high amplification, stable offset voltage means to ground, a third resistor connected from the juncture of said first diode and said first resistor to a first noninverting input of said high amplification, stable offset voltage means, temperature stable means exhibiting a substantial impedance change from high to low impedance for a small change in voltage at a predetermined voltage thereacross and connected from the juncture of said third resistor and first non-inverting input of said high amplification, stable offset voltage means to ground, and a fourth resistor connected from the juncture of said first diode and said first resistor to a D.C. voltage power supply, a D.C. voltage developed across said third resistor and said stable impedance change means being an output voltage of the voltage source which has a magnitude equal to the ratio of the sum of the resistances of said first and second resistors to that of said second resistor multiplied by the predetermined voltage across said stable impedance change means, the output voltage of the voltage source being highly stable and precise for the voltage source having the simple circuitry of the interconnected first, second, third and fourth resistors, first diode, high amplification, stable offset voltage means and stable impedance change means due to said first and second resistors being of the high stability type and said stable impedance change means being a highly stable precision voltage device, the highly stable output voltage of the voltage source being used as the supply voltage for said stable impedance change means so as to provide a highly stable current supply thereto.

2. The highly stable precision voltage source set forth in claim 1 wherein said high amplification, stable offset voltage means is an operational amplifier.

3. The highly stable precision voltage source set forth in claim 1 wherein said stable impedance change means is a zener diode.

4. The highly stable precision voltage source set forth in claim 2 wherein said stable impedance change means is a zener diode.

5. The highly stable precision voltage source set forth in claim 2 wherein said first diode having an anode electrode connected to an output of said operational amplifier and a cathode electrode connected to said first resistor, and said fourth resistor is connected to a D.C. voltage power supply of positive polarity voltage resulting in the highly stable and precise output voltage of the voltage source being of positive polarity with reference to ground.

6. The highly stable precision voltage source set forth in claim 2 wherein said first diode having a cathode electrode connected to an output of said operational amplifier and an anode electrode connected to said first resistor, and said fourth resistor is connected to a D.C. voltage power supply of negative polarity voltage resulting in the highly stable and precise output voltage of the voltage source being of negative polarity with reference to ground.

7. The highly stable precision voltage source set forth in claim 3 wherein said first diode having an anode electrode connected to the first output of said high amplification stable offset voltage means and a cathode electrode connected to said first resistor, said zener diode having a cathode electrode connected to the juncture of said third resistor and first non-inverting input of said high amplification stable offset voltage means and an anode electrode connected to ground, and said fourth resistor is connected to a D.C. voltage power supply of positive polarity voltage resulting in the highly stable and precise output voltage of the voltage source being of positive polarity with reference to ground.

8. The highly stable precision voltage source set forth in claim 3 wherein said first diode having a cathode electrode connected to the first output of said high amplification, stable offset voltage means and an anode electrode connected to said resistor, said zener diode having an anode electrode connected to the juncture of said third resistor and first non-inverting input of said high amplification, stable offset voltage means and a cathode electrode connected to ground, and said fourth resistor is connected to a D.C. voltage power supply of negative polarity voltage resulting in the highly stable and precise output voltage of the voltage source being of negative polarity with reference to ground.

9. The highly stable precision voltage source set forth in claim 4 wherein said first diode having an anode electrode connected to an output of said operational amplifier and a cathode electrode connected to said first resistor, said zener diode having a cathode electrode connected to the juncture of said third resistor and non-inverting input of said operational amplifier and an anode electrode connected to ground, and said fourth resistor is connected to a D.C. voltage power supply of positive polarity voltage resulting in the highly stable and precise output voltage of the voltage source being of positive polarity with reference to ground.

10. The highly stable precision voltage source set forth in claim 4 wherein said first diode having a cathode electrode connected to an output of said operational amplifier and an anode electrode connected to the juncture of said third resistor and non-inverting input of said operational amplifier and a cathode electrode connected to ground, and said fourth resistor is connected to a D.C. voltage power supply of negative polarity voltage resulting in the highly stable and precise output voltage of the voltage source being of negative polarity with reference to ground.

11. The highly stable precision voltage source set forth in claim 1 wherein said high amplification, stable offset voltage means consists of a first high amplification, stable offset voltage device having said first diode and first resistor serially connected in feedback circuit relationship therewith, said second resistor connected from the inverting input thereof to ground, and the third resistor connected to the non-inverting input thereof, and a second high amplification, stable offset voltage device, and further comprising a fifth resistor having a first end connected to the juncture of said first diode and said first resistor, a potentiometer having a first end connected to a second end of said fifth resistor, a tap point of said potentiometer connected to a negative polarity input of said second high amplification, stable offset voltage device, and a sixth resistor having a first end connected to an output of said second high amplification, stable offset voltage device and a second end connected to a second end of said potentiometer, said fifth and sixth resistors having equal resistance values, said potentiometer being adjustable to obtain a gain of unity for said second high amplification, stable offset voltage device so that a D.C. voltage developed at the output thereof with reference to ground is of magnitude equal to the output voltage developed across said third resistor and said stable impedance change means and of polarity opposite therewith.

12. The highly stable precision voltage source set forth in claim 11 wherein said first and second high amplification, stable offset voltage devices are first and second operational amplifiers, respectively.

13. The highly stable precision voltage source set forth in claim 11 wherein said stable impedance change means is a zener diode.

14. The highly stable precision voltage source set forth in claim 12 wherein said stable impedance change means is a zener diode.

15. The highly stable precision voltage source set forth in claim 14 wherein said first diode having an anode electrode connected to an output of said first operational amplifier and a cathode electrode connected to said first resistor, said zener diode having a cathode electrode connected to the juncture of said third resistor and non-inverting input of said first operational amplifier and an anode electrode connected to ground, and said fourth resistor is connected to a D.C. voltage power supply of positive polarity voltage resulting in the output voltages of the voltage source being of positive polarity with reference to ground across said third resistor and zener diode and of negative polarity at the output of said second operational amplifier.

16. The highly stable precision voltage source set forth in claim 12 and further comprising a seventh resistor having a resistance value equal to the parallel combination of said fifth and sixth resistors and connected from a non-inverting input of said second operational amplifier to ground for minimizing the effects of bias currents to the input thereof.

* * * * *